United States Patent [19]

Williams et al.

[11] Patent Number: 4,517,410

[45] Date of Patent: May 14, 1985

[54] AUTOMATIC USER SELECTED VARIABLE TELEPHONE MESSAGE RECORD AND PLAYBACK SYSTEM

[75] Inventors: Daniel E. Williams; John J. Carley; Paul S. Eaton, all of San Diego County, Calif.

[73] Assignee: Data Acquisition Services, San Marcos, Calif.

[21] Appl. No.: 365,020

[22] Filed: Apr. 2, 1982

[51] Int. Cl.³ .............................................. H04M 1/64
[52] U.S. Cl. ................................. 179/6.04; 179/6.06; 179/6.08; 179/6.11
[58] Field of Search ...................... 179/6.04, 6.06, 6.08, 179/6.11, 5.5, 6.01, 6.15; 364/900, 200

[56] References Cited

U.S. PATENT DOCUMENTS

| | | | |
|---|---|---|---|
| 3,691,300 | 9/1972 | Langendorf | 179/6.11 |
| 3,767,864 | 10/1973 | Smith et al. | 179/6.04 |
| 3,794,778 | 2/1974 | Smith et al. | 179/6.04 |
| 3,804,993 | 4/1974 | Honnold et al. | 179/6.08 |
| 3,825,687 | 7/1974 | Waldman | 179/6.11 |
| 3,858,006 | 12/1974 | Tomita | 179/6.08 |
| 3,931,470 | 1/1976 | Zimmermann | 179/6.08 |
| 3,953,680 | 4/1976 | Zimmermann | 179/6.11 |
| 4,011,411 | 3/1977 | Nishimura | 179/6.08 |
| 4,064,367 | 12/1977 | O'Malley | 179/6.11 |
| 4,072,986 | 2/1978 | Heidergren | 179/6.04 |
| 4,122,306 | 10/1978 | Friedman et al. | 179/6.08 |
| 4,194,089 | 3/1980 | Hashimoto | 179/6.08 |
| 4,304,968 | 12/1981 | Klausner et al. | 179/6.02 |
| 4,314,103 | 2/1982 | Wilson | 179/6.15 |
| 4,320,256 | 3/1982 | Freeman | 179/2 AS |
| 4,327,251 | 4/1982 | Fomenko et al. | 179/6.08 |
| 4,357,493 | 11/1982 | Anderson et al. | 179/6.04 |
| 4,387,272 | 6/1983 | Castro et al. | 179/6.11 |
| 4,399,331 | 8/1983 | Brown et al. | 179/6.04 |
| 4,400,586 | 8/1983 | Hanscom | 179/6.11 |

Primary Examiner—Gareth D. Shaw
Assistant Examiner—Jameson Lee
Attorney, Agent, or Firm—Brown, Martin & Haller

[57] ABSTRACT

An information system for storing and automatically retrieving selected information and transmitting it to a user over a telephone line is described. The system includes a recorder unit on which a series of information messages can be recorded on a recording medium and replayed from the recording medium. A telephone coupler unit for connection to a telephone line detects incoming calls on the line. An automatic controller operates the coupler unit to connect calls through an audio switch assembly to the recorder unit. The controller monitors connected calls to detect touch tone signals from a user and automatically operates the recorder unit in response to the signals to drive it to a user chosen position represented by the signals and to play the message recorded at that position.

30 Claims, 6 Drawing Figures

AUTOMATIC USER SELECTED VARIABLE TELEPHONE MESSAGE RECORD AND PLAYBACK SYSTEM

BACKGROUND OF THE INVENTION

The present invention relates to a system for storing and retrieving selected information and transmitting it to a user. More particularly, it concerns systems of the type comprising phone-in information centers where information can be relayed to a user over the telephone.

Such information centers normally need to be manned by an operator to select and play the desired information to a caller, the information generally being pre-recorded. Automatic telephone answering system are also known, in which a prerecorded message is played to every caller, with or without the facility for the caller to leave his own message.

Operator manned information centers are manpower time consuming and costly and would normally only be operated during normal working hours, e.g. 9 a.m. to 5 p.m. Automatic telephone answering system normally only provide for a single message to be played to every caller and are generally limited in their capabilities.

It is an object of this invention to provide an improved Information Storage and Retrieval System. Another objective of this invention is to provide an Information Storage and Retrieval System that is fully automated and will respond to user request for predetermined informational messages. A further object of the invention is to provide an Information Storage and Retrieval System which is remotely controllable and responsive to user inquiry and can be adapted to receiving and transmitting user oriented messages.

SUMMARY OF THE INVENTION

The present invention provides an information retrieval system in which a plurality of messages can be stored and a user selected message can be automatically located and replayed to the user over the telephone.

The information retrieval system according to the invention basically comprises a unit for storing and playing information messages; a telephone coupler unit including means for connection to a telephone line and means for detecting incoming calls on the line; an audio switching unit including means for selectively connecting the telephone coupler unit to the message storing means on detection of a call by the coupler unit; and an automatic controller associated with all of the units for controlling their operation. The controller includes means for monitoring a connected call to detect touch tone signals from a user, and means for automatically operating the information storing means in response to the touch tone signals to drive the information storing means to a user-chosen message position corresponding to the touch tone signals and to play the message stored at that position.

The touch tone signals are tones produced by a user depressing the keys of a conventional Touch-Tone Telephone in a sequence corresponding to a several digit code associated with a message he wishes to hear. The monitoring means detects and interprets these signals. The system preferably includes an alarm which is activated if no touch tone signals are detected within a predetermined time after a call is connected indicating that the caller probably has a normal dial telephone and cannot key in a message code. A keyboard unit is preferably associated with the controller, to allow the operator to intervene in such cases and to manually enter the requested message code.

The storage unit preferably comprises a recorder unit by means of which a series of information messages can be recorded on a recording medium, such as a tape or disc. In a preferred embodiment of the invention a cassette tape recorder with four record and play heads is provided. Each head is associated in use with a particular track on a cassette tape and a string of messages can be recorded on each track. In a preferred embodiment each message recorded is associated with a 3 digit code. When a user calls up the system on a Touch-Tone Telephone and is connected by the controller, he keys in the 3 digit code corresponding to the message he wishes to hear. The location of the message on the tape corresponding to that code is found by the controller and played to the user.

The controller preferably comprises a central processing unit controlling a series of peripheral devices including the recorder unit, the telephone coupler unit, the audio switching unit and the keyboard unit. The central processing unit comprises a microprocessor associated with a memory. The microprocessor follows program instructions stored in the memory to control the peripheral devices. The memory also includes means for storing statistical information, such as the number of messages requested and the number of times each particular message is requested, and means for storing peripheral status codes. A data readout means such as a printer unit may be provided for readout of the information stored in memory.

The information storage retrieval system of this invention can operate fully automatically, 24 hours a day, when used by callers on Touch-Tone Telephones. The systems saves operator time since an operator is only needed when setting up the system and when a caller on a dial telephone is one the line.

A fairly large number of information messages can be stored using this system. With a cassette recorder, for example, up to 120 separate five minute messages can be stored on a 600 minute capacity cassette. Alternatively, the operator can choose the message length when setting up the system. The recorder unit of this invention preferably includes means for slowing down the tape in order to allow extended recording time.

The stored messages can be quickly and easily updated by an operator using the keyboard controls.

Thus the present invention provides a versatile, fully automatic and time saving information retrieval system.

DESCRIPTION OF THE DRAWINGS

The following is a brief description of the accompanying drawings which show a preferred embodiment of the invention:

FIG. 3A is a functional diagram of the Processor Controlled Switch Assembly.

Figure 2:
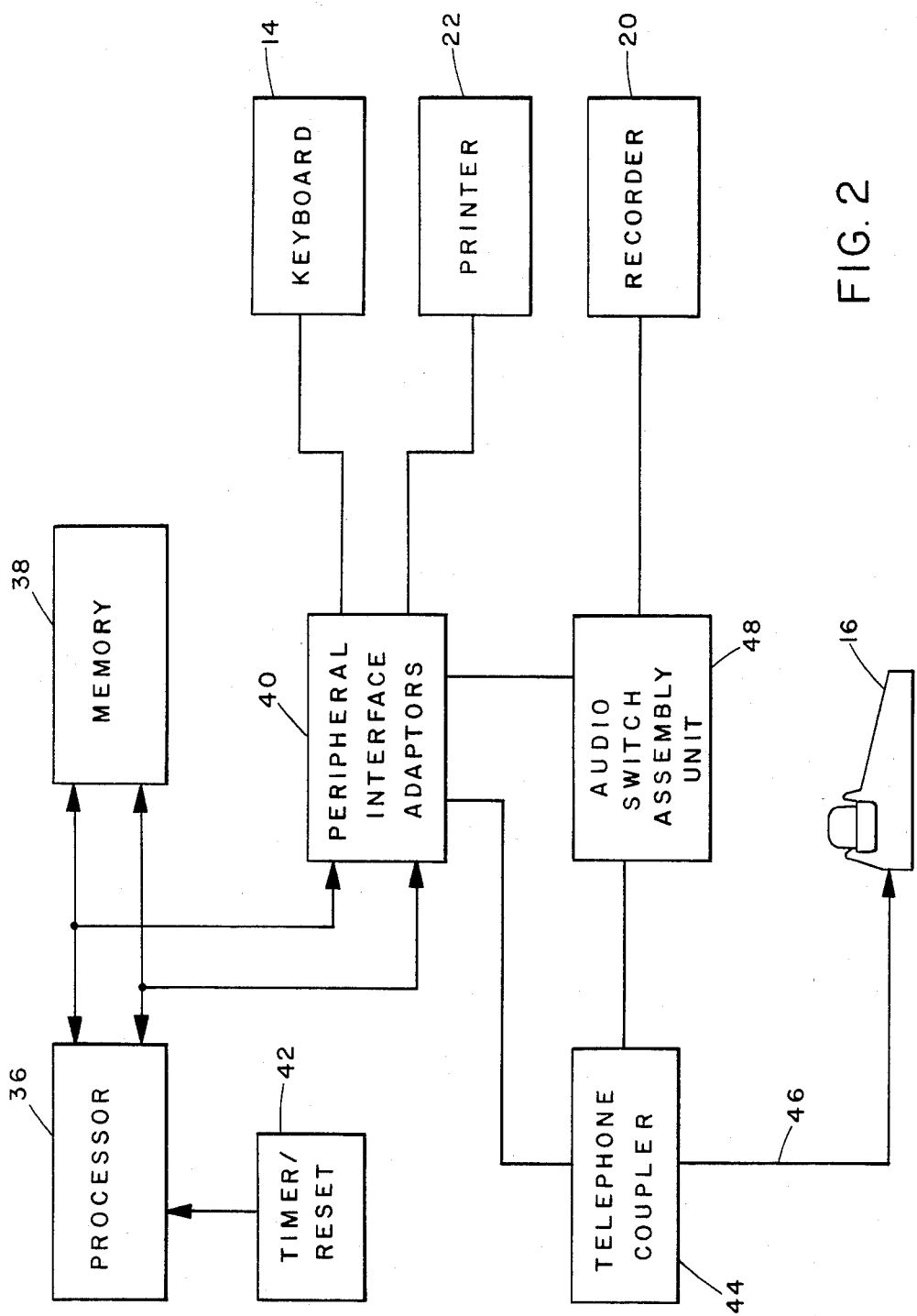
FIG. 2 is a block diagram of the major components of the system.

Table A is a listing of the code for the memory of FIG. 2.

DESCRIPTION OF THE PREFERRED EMBODIMENT

Figure 1:
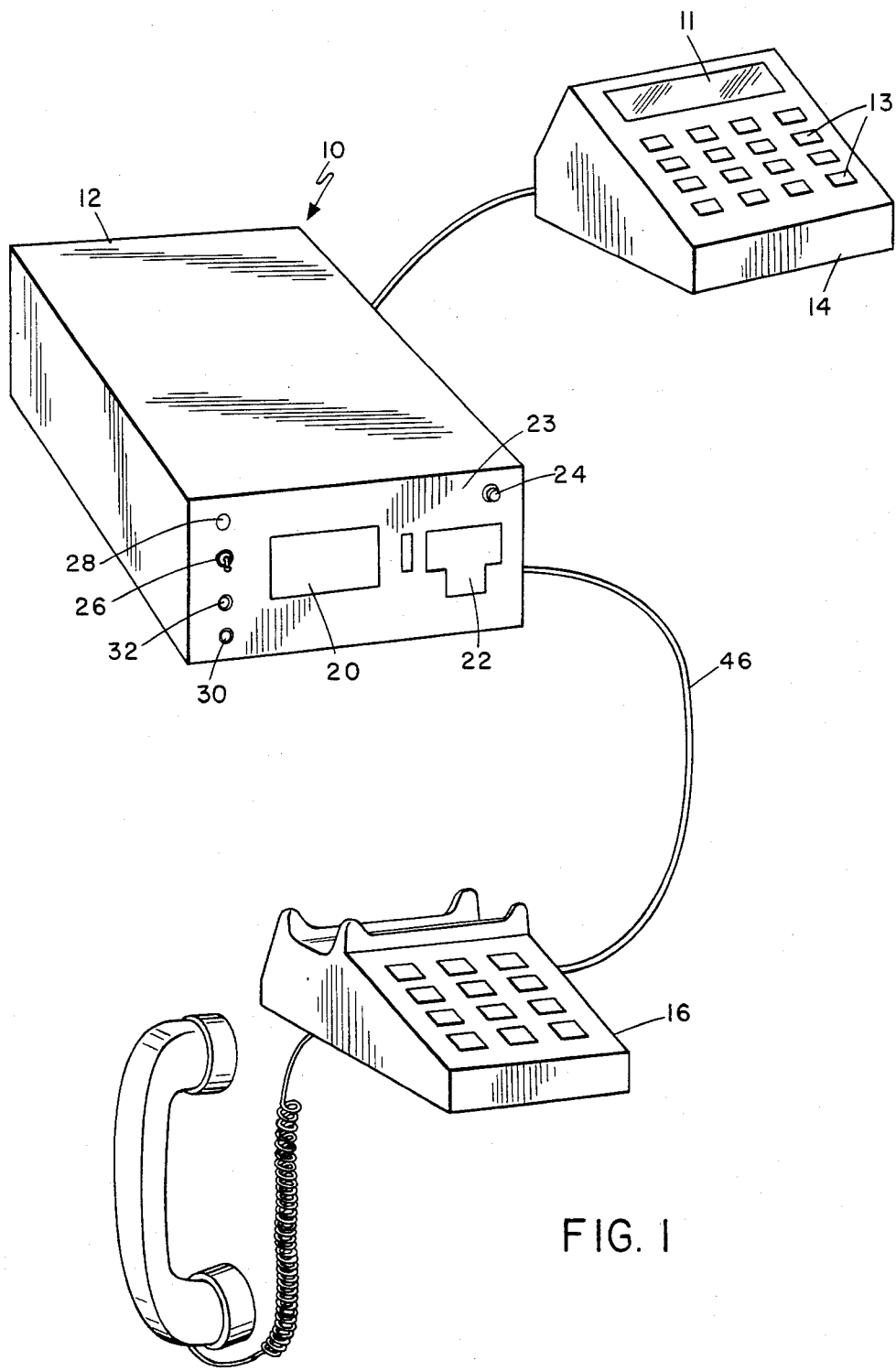
FIG. 1 is a pictorial view of the Information Storage and Retrieval System of this invention in operation with a remote user.

FIG. 1 is a pictorial view of a preferred embodiment of the Information Storage and Retrieval System of the invention. The system comprises a main unit 10 in housing 12 and a separate keyboard unit 14 with display 11 and control keys 13 for operator control.

The system is adapted for connection to a telephone line 46 and, in FIG. 1, the system is shown linked to a remote user on a Touch-Tone Telephone 16. Touch-Tone Telephones produce characteristic tones on depression of their keys and these tones are used in the remote operation of the system as described in more detail below.

The main unit 10 includes an automatic controller 20 (not visible in FIG. 1) for controlling the system and recorder and printer units 20 and 22 operable by the controller for storing audio information and outputting data, respectively. Units 20 and 22 are built into the front panel 23 of housing 12. A main unit power switch 24 and recorder unit power switch 26 are located on front panel 23, together with record indicator light 28, microphone input jack 30 and line input jack 32.

Although a printer unit 22 is used in the preferred embodiment, other types of data readout means may alternatively be used, for example a visual display. Similarly, the recorder unit 20 is a cassette recorder in the preferred embodiment but other types of data storing devices are also within the scope of this invention.

In operation, messages recorded on a recording medium in recorder unit 20 are automatically accessed by the controller in response to touch tone signals received from a user, and the messages played to the user, as described in more detail below.

FIG. 2 is a block diagram of the major system components. The automatic controller comprises a processor 36, a memory 38 associated with the processor 36, and a peripheral interface adaptor assembly 40. The processor 36 follows program instructions stored in the memory 38. The memory 38 includes programmable read only memory chips (PROM) in which program instruction are stored, and random access memory chips (RAM) in which data information (such as message location data, the number of calls and number of times each message is requested) and peripheral status codes are stored. A timer/reset assembly 42 is associated with processor 36.

The processor 36 monitors and controls all peripheral devices in the system, including: keyboard unit 14; recorder unit 20; printer unit 22; telephone coupler unit 44 which detects incoming calls over line 46; and audio switch assembly unit 48 which provides interconnection between the various units of the system under control of the processor 36. All units apart from keyboard unit 14 are mounted in the housing 12 (FIG. 1).

The processor 36 is operatively coupled to the peripheral devices via the Peripheral Interface Adapter (PIA) 40. Through the Peripheral Interface Adapter 40, the processor 36 is able to control recorder unit 20 operations such as stop, run, fast forward and rewind, and also monitors the position of a magnetic tape (not shown) via a reel counter (not shown) in the recorder unit 20. The PIA 40 also provides the data and control interface between the processor 36 and other peripherals in the system.

Through the PIA 40, the processor 36 also continuously monitors the keyboard unit 14 for any operator input and determines which control keys 13 are depressed. The keyboard unit 14 also includes a four digit hexidecimal visual display 11 (see FIG. 1). Further, the PIA 40 enables the processor 36 to control the various switching configurations of the Audio Switch Assembly unit 48, as described in detail below.

The telephone coupler 44 provides an FCC approved interface to the conventional telephone line 46. In a conventional fashion, the telephone coupler 44 provides isolation circuitry to the telephone lines 36 plus processor 36 controlled off-hook (answer) and on-hook (disconnect) control. The time reset assembly 42 includes conventional power-up, timer clock and reset circuitry necessary for conventional operation of the processor 36.

Examples of the types of components used in the preferred embodiment for the system include: the processor 36 is a Motorola 6802 microprocessor; the memory 38 comprises four Hitachi 2708 Read Only Memories (ROM) chips, each having 8K bits of storage, and four Hitachi 2114 Random Access Memory (RAM) chips, each having 2K bits of storage. The PIA 40 includes three Motorola 6821 chips and one Motorola 6840 timer chip.

Although the processor 36 preferably comprises a microprocessor, other forms of electronic control circuits may alternatively be used.

Figure 3:
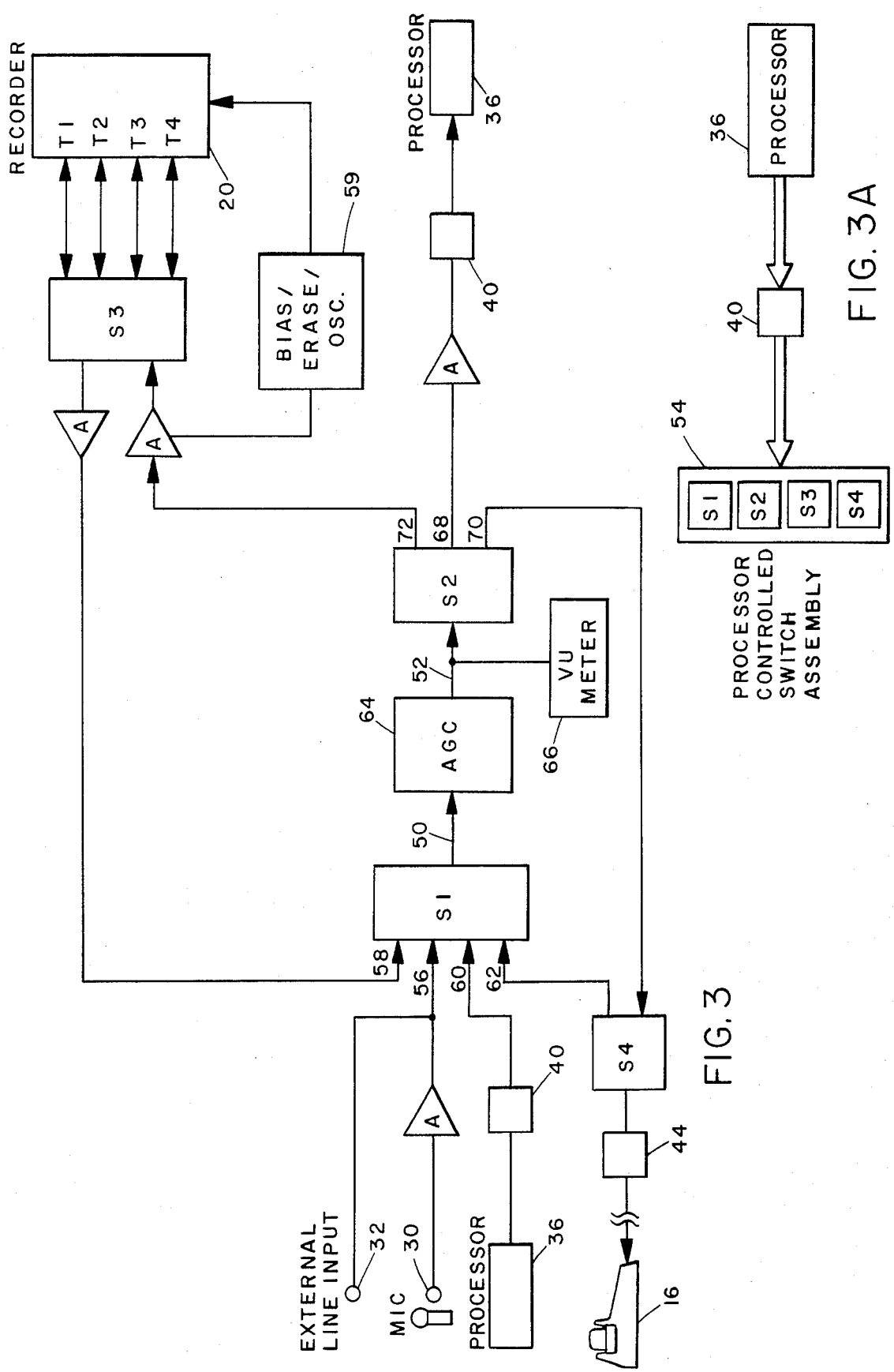
FIG. 3 is a block diagram showing the functional components of the Audio Switching Assembly of FIG. 2.

FIG. 3 is a block diagram showing the audio switch assembly unit 48. The audio switch assembly 48 functions as a multi-directional switching device to control the interconnection of the various units in the system.

A first switch assembly S1 has four inputs: a microphone jack 30 or line jack 32 input line 56; a recorder unit 20 input line 58; a processor 36 input line 60; and a telephone 16 input line 62 from coupler unit 44. These input lines are controllably connected to the input line 50 of an Automatic Gain Control (AGC) circuit 64 under a processor 36 control by the processor controlled switch assembly 54. AGC circuit 64 produces a constant output signal on output line 52 for a widely varying input signal on input line 82. The output signal strength is monitored by signal strength meter 66.

Switch assembly S1 may comprise any suitable form of multi way switching means. In the preferred embodiment it comprises a set of four independent switches connected in parallel, but it may alternatively comprise a rotary switch, for example.

A second switch assembly S2 is connected to the output line 52 of AGC circuit 64. It has three outputs: an output line 68 to the processor 36; an output line 70 to the telephone 16; and an output line 72 to the recorder unit 20.

A third switch assembly S3 provides connection between four tape recording/playing heads, T1, T2, T3 and T4, of the cassette recorder unit 20 to the recorder unit AGC input line 58 or the recorder unit AGC output line 72. Each of the heads is associated with a respective track of a four track cassette type tape when loaded in the recorder unit 20. The recorder unit 20 includes conventional erase heads. Standard oscultator, bias and erase control circuitry is provided by circuitry 59.

A fourth switch assembly S4 controls the connection of the telephone coupler unit 44 to either the telephone AGC input 62 or the telephone AGC output 70.

The switch assemblies S2, S3 and S4, like switch assembly S1, may comprise any suitable form of multi-way switch means but in the preferred embodiment they each comprise a set of independent switches connected in parallel.

All switch positions are controlled by the processor 36 by processor controlled switch assembly 54 through PIA 40, as respresented schematically in FIG. 3A. When the state of the system changes (e.g. as the result of a detected signal or program command) the processor 36 operates the appropriate switches through the processor controlled switch assembly 54 in order to configure the respective switch assemblies (S1, S2, S3 and S4) to the new system state. The operation is described in more detail below for the various operating states of the system.

Each system message (MSG) has a designated three digit message identifier (see below) and is located in corresponding message area 74 on a specific track (T1, T2, T3 or T4) of the tape 76. Depending upon whether the system is recording onto or reading from a particular tape track (T1, T2, T3 or T4) the processor 36 configures switch assembly S3 appropriately. For example, in order to record a messages on the tape 76, assuming the tape has been properly formatted (see below) the processor 36 configures switch assemblies S1, S2 and S3 to connect either line jack 32 or microphone jack 30 to the selected tape track (T1, T2, T3 or T4). When the processor 36 writes the Beginning of Message (BOM) marker of the End of Message (EOM) marker on the tape 76, (see FIG. 4) the processor 36 configures switch assemblies S1, S2 and S3 to connect the processor input line 60 to the corresponding tape track. To enable the caller to listen to a recorded message, the processor 36 configures switches S1, S2, S3 and S4 to connect the desired tape track recorder unit input line 58 to the telephone output line 70. Alternatively, the caller may record a message onto a specified tape track when the processor 36 configures the switch assemblies S4, S1, S2, S3 to connect the telephone input line 62 to the recorder unit output 72 onto the designated tape track through switch assembly S3.

The processor 36 can monitor the telephone input line 46 to detect and analyze touch tones by configuring switch assemblies S4, S1 and S2 of the audio switch assembly 48 to connect the telephone input line 62 to the processor output line 68.

System initialization is controlled by the processor 36 through the application of power to the system by power switch 24. As soon as power is applied, the processor 36 enters a "Power Up State" and performs various housekeeping tasks and self-test functions to verify the operating capability of the system. Any failures generate associated error messages to be listed on the printer unit 22. System initialization generally includes formatting the tape 76 and accordingly, a taper 76 is installed in the recording unit 20. If the tape 76 has been properly formatted, the processor 36 scans the entire tape 76 and builds a file of the real count number associated with each Beginning of Message (BOM) marker for each track on the taper 76. If the tape has not been formatted, the processor 36 formats the tape by writing a Beginning of Message (BOM) marker on each track of the tape 76 at operator selected message area 74 intervals. The number of these messages areas 74 is computed by the processor 36 which maintains a file of the three digit message identifier, recorder unit real count number, BOM count and track designation for each message area 74. With the tape properly formatted, the operator may record the desired informational messages (see below). Alternative methods for formatting the tape 76 may be employed such that each message area 74 may have a variable length depending upon processor 36 control and specific user applications.

Figure 4:
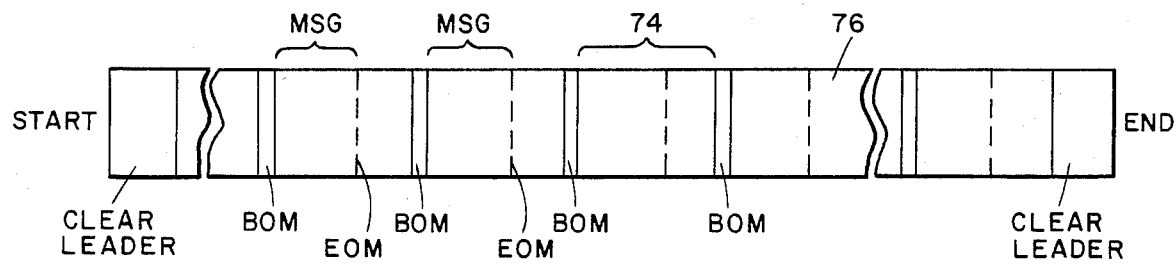
FIG. 4 is a schematic diagram of a portion of a magnetic tape on which coded information messages have been recorded.

The procedure for recording a series of informational messages on the tape 76 are described in reference to FIG. 4. To record informational messages, a properly formatted tape 76 is loaded into the recording unit 20 and recorder switch 26 is activated. Using keyboard 14 (FIG. 1) controls, the processor 36 advances the tape 76 to the message area 74 corresponding to the operator selected message identifier. The processor 36 responds to control key 13 actions to configure switch assemblies S1 and S2 to connect the microphone jack 30 input line 56 to the recorder unit output line 72. The processor also controls switch assembly S3 at the same time to connect the recorder output line 72 to the desired tape track.

The message can now be recorded via microphone input jack 30 or line input jack 32. When all messages have been recorded the processor 36 maintains in memory 38 a file of three digit messages identifiers associated with each recorded message area 74.

FIG. 4 represents a portion of one track of a tape 76 on which a series of messages has been recorded. At the start of each message area 74 a Beginning of Message (BOM) marker is recorded. The message (MSG) follows immediately after the BOM. After the message is recorded, the operator depresses and End of Message (EOM) key, and the processor 36 automatically records an End of Message (EOM) marker.

In the preferred embodiment, the four track tape 76 of approximately 150 minutes in length is formatted into 30 separate five minute long message areas 74 per track therefore, a total of 120 five minute messages may be recorded on a single cassette tape 76. Alternatively, the processor 36 may be programmed to permit the user to define the specific message length for each message area 74 and thus using the variable message area format, the user may substantially increase the number of messages available to the system. However, in the conventional configuration of the system, track 1 is arbitrarily assigned number identifiers 100 through 129; track 2 is assigned number identifiers 200 through 229, and so on. On track 1, location 16, or a message identifier number 116 (approximately the center of the tape) generally contains an introductory message. Usually, the introductory message is played when the phone is answered by the system to briefly explain the operation of the system to the caller. Under processor 36 control, the recorder unit 20 is returned to the introductory message position at the end of every call. The position of the introductory message is generally referred to as the "home" position. An "error" message may also be recorded on the tape, to be played if the caller enters an invalid message identifier.

The recorder unit 20 of the preferred embodiment operates at a slower speed than conventional units. It includes a factory option for slowing down the tape drive so that the tape runs at 0.375"/sec, (1/5th the normal speed). This permits a greater number of messages to be recorded on a given length of tape. In the preferred embodiment, the recorder unit 20 may be, for example, a Triple I, Inc. Phi-Deck, Select-O-Sync Model A 80005188 cassette tape drive. Further, the printer unit 22 may be, for example, a Hycom, Model DC 12B 7 segment dot matrix type thermal printer. The automatic gain control circuit is a Signetics NE571 conventionally wired automatic gain control circuit and the switch assemblies may be, for example, quad digital controlled analog switches Model DG201 by Siliconix.

Figure 5:
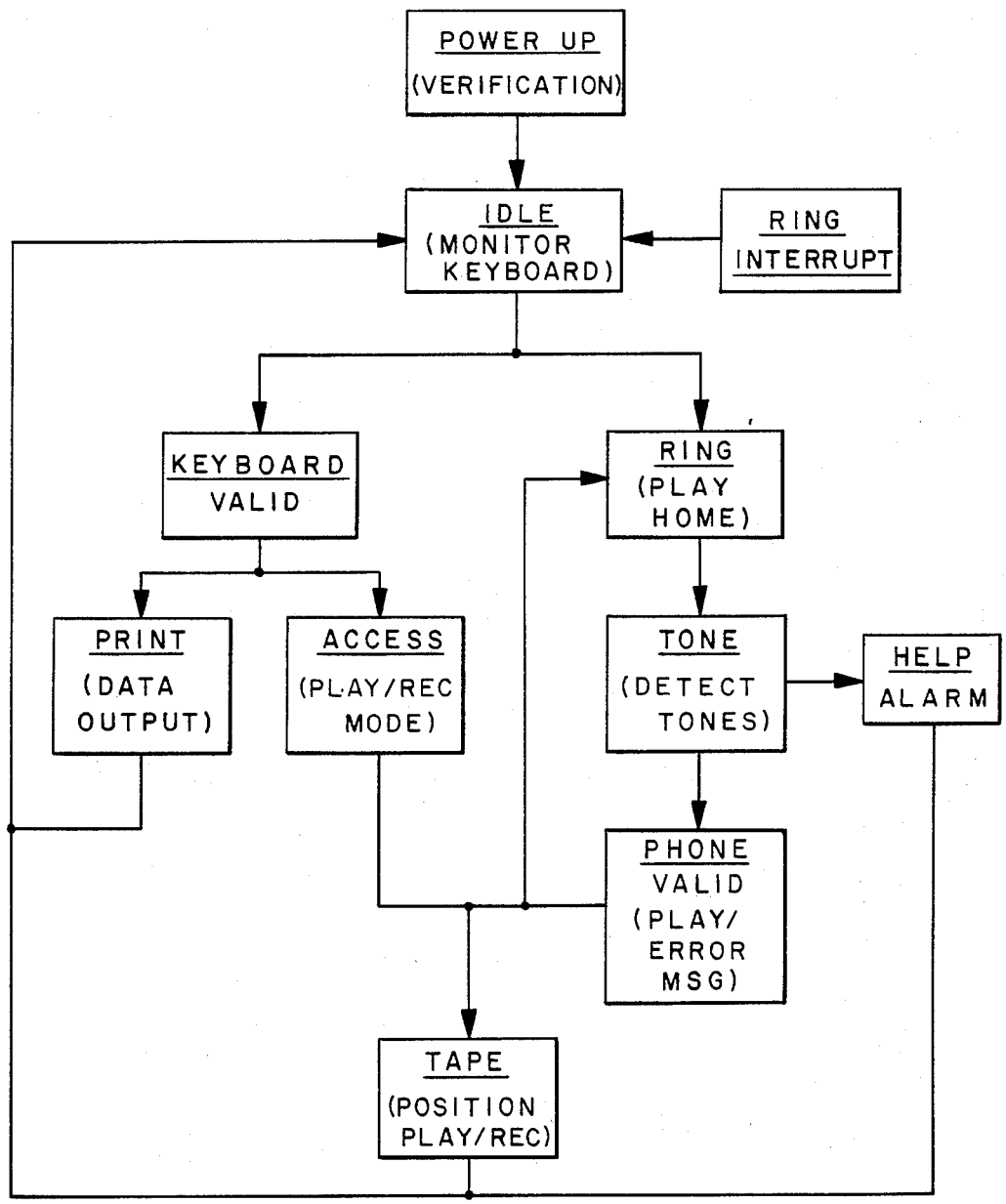
FIG. 5 is a flow chart of the major functions performed by the processor.

The operation of the system as an Information Storage and Retrieval System is described with reference to the flow chart of FIG. 5 and the system configuration shown in FIG. 2. Generally, the system is designed to operate by stepping through a series of program controlled states. Each state is entered as the result of an external event or a lapsed time period. The system configuration is changed in response to the system state by processor 36 control of the separate switch assemblies in the audio switch assembly 48.

As discussed above, system initialization is effected by the application of power to the system causing it to enter the "Power Up" state. In this state the processor 36 and all the peripheral devices are initialized. The processor 36 configures the tape recorder to determine whether or not a tape cassette is present. If a tape cassette is present and properly formatted, the processor verifies the number of message blocks (by counting BOM markers) and associated reel count then positions the tape to the home position. The processor also performs self-check functions to verify system operating capabilities. Any detected failures cause the processor 36 to print an error message on the printer unit 22. If all tests are successful, the system enters the "Idle State".

In the "Idle State" the system is ready to receive calls. The processor 36 monitors the keyboard 14, waiting for an input, and enables a ring interrupt from the telephone coupler 44 to indicate a call is incoming. The audio switch assembly 48 is configured for the telephone 16 to be connected to the processor 36. Detection of a ring signal over line 46 causes the system to enter the "Ring State", while keyboard operation would cause the processor 36 to enter the "Keyboard State".

When a ring signal is detected by the processor 36 in the form of a ring interrupt, the processor verifies that signal to insure that it is not the result of transient noise. The processor 36 then configures the system to connect the recorder unit 20 to the telephone 16. Referring to FIG. 3, switch assemblies S4, S1, S2 and S3 are configured to connect the caller to the recorder unit 20 via telephone input line 62 and recorder output line 72. The processor 36 makes a return call to the "Tape State" to play the home message. Upon completion of the "home" message, the system enteres the "Tone State".

In the tone state, a timer is started and the system is configured to enable the processor 36 to monitor incoming telephone line 46 for incoming touch-tone signals. If the caller generates touch-tone signals via his phone key pad, the system is set to the "phone" state. If the caller enters no touch-tone signals within a predetermined time after the "home" message is played, for example because he has a dial telephone, the system enters the "Help State".

In the phone state, the processor 36 checks the touch tone signals entered for a valid 3 digit message identifier. If valid, the processor 36 drives the recorder unit 20 to the message block position corresponding to that identifier. Switch assemblies S4, S1, S2 and S3 are configured to connect the caller to the cassette recorder output. The processor calls the tape state to play the selected message. If the code entered is invalid (i.e. does not correspond to a code stored in the memory), the processor 36 locates and plays an "error" message. The caller may then be given an opportunity to re-enter a valid message identifier.

If another request is not made within a predetermined time after the end of the preceeding message (detected by the EOM marker) the caller is disconnected and the system returned to the idle state. Alternatively, if no additional messages are allowed, the system disconnects the caller at the end of the message and the system is returned to the idle state.

After a message is played the statistics are updated. A counter corresponding to the chosen message code is incremented and the count is stored.

If no touch tones are detected after the phone is answered after the "home" message played, the processor 36 enters the help state and activates an alarm to notify the operator that the caller needs assistance. The processor 36 then returns to the idle state to monitor the keyboard 14 for an operator input. Generally, the operator, over the telephone asks the caller for the message identifier of the message he wishes to hear and then key in the code at the keyboard 14. Keyboard 14 activity causes the procesor to enter the keyboard state (see below) to operate the recorder unit 20 to play the selected message.

If the system detects a keyboard intervention while in the idle state, it enters the "Keyboard State". The processor monitors the keyboard and checks for a command key input (e.g. print, play, record, etc.).

If the keyboard print command key is depressed, the processor 36 enters the "Print State". In this state, statistical data stored in the memory is printed out at printer unit 22. The operator depresses the key corresponding to the information which he wishes to have printed out, such as the total number of calls, the messages accessed and the number of times each message has been requested, etc. The statistics tables can then be reset by keyboard controls.

The "access" state is entered if the keyboard 14 play or record keys are depressed. The message identifier previously entered at the keyboard 14 is checked for a valid entry. An invalid entry results in an error display on the keyboard display 11. If the entry is valid, the system is configured and the processor calls the "Tape State" to either play or record the selected message.

A "tape state" is entered from the access state, the ring state or the phone state. In this state the processor 36 positions the cassette tape and engages the heads to either play or record as selected. This state is exited in response to an EOM marker or a reset command if in the play mode; or in response to an "End of Message" or "reset" command in the record mode.

Table A below is a listing of the code for the 6802 microprocessor that performs the functions described above.

TABLE I

| Memory Address | Memory Code |
|---|---|
| 2000 | 0F CE 87 FF 6F 00 09 26 FB 8E 07 FF 8D 09 BD 27 |
| 2010 | A0 BD 28 RB 7E 20 50 CE 07 FF E6 00 86 FF A7 00 |
| 2020 | A1 00 26 07 43 63 00 A1 00 27 02 20 FE E7 00 09 |
| 2030 | 26 E8 39 CE 0E 0E FF 00 29 FF 00 2B BD 28 0C 86 |
| 2040 | FD B7 64 92 86 28 B7 00 FE 39 86 FF B7 64 92 39 |
| 2050 | BD 00 00 06 49 B7 00 43 B6 00 43 81 4B 27 0B 81 |
| 2060 | 49 27 07 FE 00 58 27 F0 6E 00 0F B6 64 A1 84 FB |
| 2070 | 07 64 A1 06 F0 F7 64 A0 B6 64 A1 8A 04 B7 64 A1 |

TABLE I-continued

| Memory Address | Memory Code |
|---|---|
| 2080 | 53 F7 64 A0 B6 64 C1 8A 01 B7 64 C1 86 43 B7 64 |
| 2090 | 40 0E B6 64 A0 81 0F 26 0E F6 00 43 C1 4B 27 F2 |
| 20A0 | FE 00 58 27 ED 6E 00 BD 21 72 BD 21 0D 36 BD 28 |
| 20B0 | 0C 32 F6 00 5A 27 07 81 0F 27 20 7E 2A 66 81 09 |
| 20C0 | 22 02 20 94 81 0D 26 07 06 01 F7 00 5A 20 89 CE |
| 20D0 | 21 01 BD 28 54 FF 00 58 7E 20 50 CE 01 12 86 03 |
| 20E0 | 06 FF 6F 00 08 5A 2A FA 4A 2A F5 7F 00 5B 7E 00 |
| 20F0 | 5A 7E 20 50 0C 64 48 0D 64 48 0F 64 48 00 64 48 |
| 2100 | 39 0A 21 D3 0B 64 48 0D 2A 66 00 21 00 CE 00 29 |
| 2110 | E6 02 E7 03 E6 01 E7 02 E6 00 E7 01 A7 00 39 CE |
| 2120 | 00 29 A6 03 F6 21 5A 11 23 2A F6 21 5B 11 22 24 |
| 2130 | E6 01 A6 02 C1 09 22 1C 81 09 22 18 CE 21 5E A1 |
| 2140 | 00 27 04 08 08 20 F8 A6 01 1B B1 00 48 22 05 B7 |
| 2150 | 00 2D 5F 39 7F 00 2D C6 01 39 00 04 00 01 00 00 |
| 2160 | 01 0A 02 14 03 1E 04 28 05 32 06 3C 07 46 08 50 |
| 2170 | 09 5A 86 FF B7 64 92 86 4B B7 00 43 B6 2B BC BD |
| 2180 | 29 E9 B6 64 A0 F6 64 A1 C4 FB F7 64 A1 06 0F F7 |
| 2190 | 64 A0 F6 64 A1 CA 04 F7 64 A1 8A F0 B7 64 A0 78 |
| 21A0 | 00 30 B6 64 A0 5F CE 21 C2 A1 00 27 08 81 FF 27 |
| 21B0 | 0F 08 5C 20 F4 B1 64 A0 27 FB B6 2B BC BD 29 E9 |
| 21C0 | 39 EE DE BE 7E ED DD BD 7D EB DB BB 7B E7 D7 |
| 21D0 | 87 77 FF 86 41 B7 00 43 BD 21 1F 5D 27 05 BD 20 |
| 21E0 | 33 20 1A 86 40 BD 23 17 86 41 BD 24 21 86 80 BD |
| 21F0 | 23 17 BD 2A 76 86 80 BD 23 17 BD 64 48 86 49 B7 |
| 2200 | 00 43 CE 00 00 FF 00 58 39 86 50 B7 00 43 BD 21 |
| 2210 | 1F 5D 26 32 86 40 BD 23 17 86 41 BD 24 21 86 82 |
| 2220 | BD 23 17 BD 2A 76 86 80 BD 23 17 7C 00 0B B1 00 |
| 2230 | 03 27 20 86 82 BD 23 17 B6 00 28 B7 01 06 86 54 |
| 2240 | B7 00 43 7E 20 58 BD 22 FB 7C 00 0A B6 00 0A 81 |
| 2250 | 03 26 BD 64 48 7E 20 50 86 54 B7 00 43 7F 00 |
| 2260 | 27 86 28 B7 01 06 7E 20 58 BD 64 48 86 49 B7 00 |
| 2270 | 43 39 86 48 B7 00 43 86 FD B7 64 92 86 28 B7 01 |
| 2280 | 02 39 B6 00 43 81 54 27 01 39 7F 01 06 7C 00 27 |
| 2290 | CE 22 00 5F B6 64 C0 A1 00 27 08 08 5C C1 03 27 |
| 22A0 | 19 20 F4 BD 21 0D BD 28 0C 86 02 B1 00 27 B1 00 |
| 22B0 | 27 26 07 CE 22 09 FF 00 58 39 86 28 B7 01 06 39 |
| 22C0 | 01 02 FF 86 49 B1 00 43 27 01 39 86 52 B7 00 43 |
| 22D0 | CE 22 D7 FF 00 58 39 7F 00 0A CE 00 00 FF 00 58 |
| 22E0 | 86 52 B7 00 43 86 50 BD 23 17 CE 00 28 B7 01 06 |
| 22F0 | 7F 00 27 86 54 B7 00 43 7E 20 58 CE FF FF FF 00 |
| 2300 | 29 CE 01 00 FF 00 2B 86 40 BD 23 17 86 41 BD 24 |
| 2310 | 21 86 50 BD 23 17 39 06 58 F7 00 43 CE 23 B0 BD |
| 2320 | 28 54 AD 00 BD 24 7E 39 7C 64 A1 B6 64 A0 BD 24 |
| 2330 | 82 B6 10 87 00 F6 BD 28 98 BD 29 E9 FF 00 42 B6 |
| 2340 | 00 42 26 0C B6 00 41 27 F6 BD 24 7E 7A 64 A1 39 |
| 2350 | B6 64 A1 84 FB B7 64 A1 C6 0F F7 64 A0 8A 04 B7 |
| 2360 | 64 A1 7F 64 A0 B6 2B BC BD 29 E9 B6 64 A0 81 00 |
| 2370 | 27 D7 81 00 27 09 81 00 26 C5 BD 23 9A 20 C5 39 |
| 2380 | 23 9A 20 C5 39 B6 00 48 44 B7 00 47 BD 26 34 39 |
| 2390 | B6 00 2D B7 00 47 BD 26 34 39 86 83 B7 64 41 FE |
| 23A0 | 29 C0 FF 64 44 86 A0 BD 29 E9 86 03 B7 64 41 39 |
| 23B0 | 40 23 90 50 23 28 60 23 24 70 25 3A 80 23 85 90 |
| 23C0 | 24 8D FF 00 92 05 BD 24 76 BD 24 0C 86 10 BD 29 |
| 23D0 | E9 C6 FF B6 64 90 2A 06 46 25 F6 5A 26 F5 BD 24 |
| 23E0 | 7E BD 24 70 BD 24 82 B6 64 90 46 24 FA CE 00 5C |
| 23F0 | FF 00 49 BD 28 98 CE 00 00 FF 00 4B B6 64 92 86 |
| 2400 | 1F B7 64 93 39 FE 23 C3 FF 64 42 39 FE 23 C3 FF |
| 2410 | 00 56 CE 00 56 64 01 64 01 64 01 EE 00 FF 64 42 |
| 2420 | 39 81 41 27 05 81 42 27 08 3F 7F 64 A2 7F 64 90 |
| 2430 | 39 86 40 B7 64 A2 7F 64 90 39 86 41 27 21 7F |
| 2440 | 00 41 7F 00 39 7F 00 3E 86 4A B7 64 41 FE 29 C2 |
| 2450 | FF 64 44 39 CE 00 3A B6 00 3C 26 13 A6 00 B1 00 |
| 2460 | 53 25 F4 B6 00 3C 26 07 E6 01 F1 00 54 25 F4 39 |
| 2470 | B6 64 90 2B FB 39 86 FB 20 0A 86 EF 20 06 86 DF |
| 2480 | 20 02 86 BF B7 64 92 86 FF B7 64 93 39 BD 23 C6 |
| 2490 | FE 29 C0 FF 64 44 86 42 BD 24 21 86 10 B7 00 F6 |
| 24A0 | 86 FF B7 00 3F 86 42 B7 64 40 0E 86 80 B1 00 3B |
| 24B0 | 24 FB B6 64 92 7F 00 3C CE 00 29 6F 00 6F |
| 24C0 | 02 6C 03 7C 00 48 86 83 B7 64 41 BD 24 7C 86 A0 |
| 24D0 | BD 29 E9 86 03 B7 64 41 B6 23 C5 B1 00 2B 26 FC |
| 24E0 | F6 00 3C 27 D3 B7 64 41 86 16 B7 64 93 7F 00 3C |
| 24F0 | 7F 00 3F BD 23 C6 BD 24 7E 01 20 BC CE 00 3A A6 |
| 2500 | 00 A6 01 FE 00 49 A7 00 F7 01 08 08 F7 00 49 39 |
| 2510 | FE 00 49 09 09 A6 00 E6 01 09 09 E0 01 A2 00 F0 |
| 2520 | 00 55 82 00 08 08 EB 01 A9 00 CE 00 53 A7 00 E7 |
| 2530 | 01 B6 00 55 80 03 B7 00 55 39 BD 24 3A 86 43 B7 |
| 2540 | 64 41 CE 00 00 FF 00 3A 86 80 A7 01 08 08 FF |
| 2550 | C6 B6 00 41 27 FB CE 00 5C 86 80 A7 01 08 08 FF |
| 2560 | 00 49 7C 00 29 BD 28 0C 86 30 BD 29 E9 BD 24 3A |
| 2570 | 86 00 41 27 FB BD 24 FC FE 00 49 09 09 E6 01 A6 |
| 2580 | 00 C0 06 82 00 E7 01 A7 00 7F 00 3C BD 25 10 BD |
| 2590 | 28 0C 86 FF B7 00 3E BD 24 7A BD 24 54 BD 24 7E |
| 25A0 | BD 27 2A B6 00 3C 26 34 BD 24 3A BD 24 82 BD 24 |
| 25B0 | 3A B6 00 41 81 FF 27 07 B6 00 3C 26 1F 20 F2 BD |
| 25C0 | 24 FC CE 00 29 A6 00 81 09 27 05 4C A7 00 20 04 |
| 25D0 | 6F 00 6C 01 7C 00 48 B6 00 3C 27 B0 BD 23 C6 BD |
| 25E0 | 24 3A B6 00 41 27 FB 86 00 B7 00 46 BD 24 7E BD |
| 25F0 | 24 70 7F 00 3C BD 24 05 39 10 4F CE 00 5C 11 27 |
| 2600 | 05 4C 08 08 20 F8 FF 00 37 39 CE 00 3A A6 00 E6 |
| 2610 | 01 CB 32 89 00 CE 00 4B A7 00 E7 01 7F 00 40 7E |
| 2620 | 26 D5 BD 24 3A 86 03 B7 64 40 86 FF B7 00 3E BD |
| 2630 | 23 C6 0E 39 BD 24 3A BD 28 0C 86 43 B7 64 40 BD |
| 2640 | 24 0C 0E F6 00 46 8D B2 FE 00 37 FF 00 4D F6 00 |
| 2650 | 47 8D A7 F1 00 46 27 B2 25 15 86 FF B7 00 40 FE |
| 2660 | 00 37 A6 00 E6 01 FE 00 4D E0 01 A2 00 20 15 7F |
| 2670 | 00 40 FE 00 4D A6 00 E6 01 FE 00 37 E0 01 A2 00 |
| 2680 | CB 20 89 00 CE 00 4F A7 00 E7 01 06 FF B6 00 47 |
| 2690 | 5A 5A 4A 26 FB CE 00 4F A6 01 10 E6 00 C2 00 BB |
| 26A0 | 25 F9 C9 00 CE 00 4B A7 01 E7 00 BD 27 03 CE 00 |
| 26B0 | 3A E6 01 A6 00 51 E0 01 A2 00 A7 00 E7 01 |
| 26C0 | CE 00 4F E6 01 A6 00 CE 00 51 E0 01 A2 00 CE 00 |
| 26D0 | 4B E7 01 A7 00 BD 27 03 BD 24 3A BD 24 82 B6 00 |
| 26E0 | 41 27 FB CE 00 00 FF 00 3A B6 00 47 B7 00 46 BD |
| 26F0 | 24 05 86 10 BD 29 E9 BD 24 7E BD 70 39 BD 24 |
| 2700 | 76 20 0D 86 FF B7 00 3E B6 00 40 27 F1 BD 24 7A |
| 2710 | FE 00 4B FF 00 53 BD 24 54 CE 00 3A E6 01 A6 00 |
| 2720 | CE 00 51 E7 01 A7 00 BD 24 7E B6 64 90 48 25 FA |
| 2730 | 39 CE 00 5C FF 00 49 CE 27 8B FF 00 35 FE 00 35 |
| 2740 | A6 00 E6 01 08 08 8C 27 9F 27 11 FF 00 35 FE 00 |
| 2750 | 49 A7 00 E7 01 08 08 FF 00 49 20 E1 01 BD 23 C6 |
| 2760 | 7F 00 46 86 01 B7 00 47 BD 24 3A 86 43 B7 64 40 |
| 2770 | 0E B6 00 41 81 FF 26 F9 CE 00 00 FF 00 3A 7F 00 |
| 2780 | 3C BD 24 7E BD 24 70 BD 26 34 3F 00 80 02 DA 05 |
| 2790 | 12 07 32 09 3B 0B 30 0D 13 0E E6 10 AB 12 63 01 |
| 27A0 | 0F 4F CE 64 90 A7 01 A7 03 A7 11 A7 13 A7 31 A7 |
| 27B0 | CE 64 90 A7 30 43 A7 02 A7 12 A7 32 86 F0 A7 |
| 27C0 | 10 86 06 A7 00 CE 64 90 86 06 A7 01 A7 11 A7 31 |
| 27D0 | 86 16 A7 03 86 34 A7 13 86 04 A7 33 86 02 B7 64 |
| 27E0 | 40 86 03 B7 64 41 B7 64 40 BD 24 05 FF 24 C3 CE |
| 27F0 | 18 00 FF 64 46 FE 23 C3 FF 64 42 CE 31 A0 FF 64 |
| 2800 | 44 86 82 B7 64 40 86 02 B7 64 41 39 0F F6 64 A1 |
| 2810 | C4 FB F7 64 A1 37 86 0F B7 64 A0 CA 04 F7 64 A1 |
| 2820 | CE 00 29 F6 64 A2 C4 F0 F7 64 A2 A6 00 B7 64 A0 |
| 2830 | 0D 59 FA 64 A2 27 04 A6 22 A6 08 8C 00 2D 26 ED 33 F7 |
| 2840 | 64 A1 86 F0 B7 64 A0 CA 04 F7 64 A1 7F 64 A0 B6 |
| 2850 | 64 A0 0E 39 E6 00 27 08 11 27 05 08 08 08 20 F4 |
| 2860 | EE 01 39 FF 00 30 CE 00 30 AB 01 24 02 6C 00 A7 |
| 2870 | 01 EE 00 39 86 04 B7 00 34 20 08 CE FF FF 86 02 |
| 2880 | B7 00 34 FF 00 32 B6 00 34 4A 27 0B FE 00 32 8C |
| 2890 | 00 00 27 F5 09 20 F8 39 CE 00 00 FF 00 29 FF 00 |
| 28A0 | 2B 39 CE 03 F0 6F 00 09 26 FB 39 8E 01 0E CE 29 |
| 28B0 | E8 A6 00 36 09 8C 29 CA 26 F7 8E 03 FB 39 FF FF |
| 28C0 | B6 00 43 91 58 27 61 91 53 27 00 91 54 27 2C 91 |
| 28D0 | 49 27 17 91 4B 27 00 91 52 27 34 91 48 27 36 91 |
| 28E0 | 41 27 3B 91 50 27 40 7E 20 00 B6 64 C1 2A 03 7E |
| 28F0 | 22 C3 B6 64 41 2A 03 7E 00 00 3B B6 64 41 2A 03 |
| 2900 | BD 00 00 B6 64 A3 2A 03 BD 22 82 3B B6 64 41 2A |
| 2910 | 03 BD 00 00 3B B6 64 41 2A 03 BD 00 00 3B B6 64 |
| 2920 | 41 2A 03 BD 00 00 3B 3B B6 64 93 2B 27 48 2B 2D |
| 2930 | 86 64 41 2A 86 02 26 50 85 0 26 0D 85 04 26 |
| 2940 | 06 B6 64 A1 2B 08 3F 7E 29 C8 7E 29 FC 3B 86 FF |
| 2950 | B7 00 42 3B 86 FF B7 00 3C B6 64 92 3B B6 00 3E |
| 2960 | 26 06 FE 29 C9 BD 28 7E C6 05 86 08 B5 64 90 27 |
| 2970 | 14 5A 27 02 20 F6 FE 00 3A 08 FF 00 3A BC 28 BE |
| 2980 | 26 03 7F 00 3D B6 64 92 3B B6 00 3F 27 04 FE 64 |
| 2990 | 44 3B FE 64 44 FF 00 30 CE 00 30 A6 00 26 1A A6 |
| 29A0 | 01 B1 29 C5 24 13 B1 29 C7 25 0E B6 00 F2 26 05 |
| 29B0 | 86 07 B7 00 F2 7C 00 39 3B FE 29 C2 FF 64 44 3B |
| 29C0 | 01 A0 03 A4 03 86 03 5E 3F 00 10 00 00 2A 4E 00 |
| 29D0 | 00 2A 27 00 01 00 FC 00 00 20 4A 00 00 22 69 00 |
| 29E0 | 00 22 72 00 00 2A 66 00 FF B7 00 FA 86 01 B7 00 |
| 29F0 | FB 86 FF B7 00 FC 7D 00 FC 26 FB 39 FE 64 46 CE |
| 2A00 | 00 F2 6D 00 27 16 6A 00 26 12 6D 01 27 04 6F 02 |
| 2A10 | 20 0A FF 01 0F EE 02 AD 00 FE 01 0F 08 08 08 08 |
| 2A20 | 86 FF A1 01 26 DC 3B 86 10 B7 00 F6 CE 00 29 A6 |
| 2A30 | 00 E6 01 4C 81 0A 24 08 A7 00 E7 01 BD 28 0C 39 |
| 2A40 | 4F 5C C1 06 24 02 20 F0 4F 5F 6C 02 20 EA B6 00 |
| 2A50 | 39 81 11 25 0D 86 FF B7 00 41 86 0A B7 64 41 FE |
| 2A60 | 64 44 7F 00 39 39 86 53 B7 00 43 B6 00 2B CE 2B |

TABLE I-continued

| Memory Address | Memory Code |
|---|---|
| 2A70 | 97 BD 28 54 6E 00 B6 00 2C CE 2B AD BD 28 54 FF |
| 2A80 | 00 00 B6 00 2A 5F 4A 27 04 CB 0A 20 F9 FB 00 2B |
| 2A90 | 17 FE 00 00 BD 28 63 FF 00 00 EE 00 FF 00 0F A6 |
| 2AA0 | 01 8B 01 19 A7 01 4D 26 07 A6 00 8B 01 19 A7 00 |
| 2AB0 | E6 01 FE 00 00 A7 00 E7 01 39 CE 2B 73 FF 00 00 |
| 2AC0 | CE 00 11 4F A7 10 A6 00 E6 01 FE 00 0F A7 00 A7 |
| 2AD0 | 01 08 08 FF 00 0F FE 00 00 08 08 A6 00 26 DE CE |
| 2AE0 | 00 25 A6 00 16 84 0F C4 F0 CE 00 11 A7 0A E7 0B |
| 2AF0 | CE 00 25 A6 02 E6 03 84 0F C4 F0 0E 00 11 A7 0C |
| 2B00 | E7 0D 7E 20 50 CE 2B 85 7F 00 0C 96 0D CE 00 11 |
| 2B10 | C6 10 A7 00 5A 2A FB 6F 00 CE 00 11 86 4D A7 02 |
| 2B20 | 86 54 A7 0E CE 01 12 FF 00 00 A6 00 16 CE 00 11 |
| 2B30 | 84 0F E7 0A FE 00 00 A6 01 CE 00 11 16 84 F0 A7 |
| 2B40 | 0B C4 0F E7 0C 5F B6 00 0C B1 00 0D 2D 06 B0 00 |
| 2B50 | 0D 5C 20 F5 5C E7 04 16 84 F0 A7 05 C4 0F E7 06 |
| 2B60 | CE 00 11 FE 00 00 08 7C 00 0C A6 00 81 FF 26 B7 |
| 2B70 | 7E 20 50 20 20 20 54 4F 54 41 4C 20 3D 20 20 20 |
| 2B30 | 20 20 20 20 00 20 20 4D 20 20 20 20 20 20 20 20 |
| 2B90 | 20 20 20 20 54 20 00 01 2A BA 02 2B 05 00 20 50 |
| 2BA0 | 86 64 B7 00 28 CE 01 12 FF 00 04 86 01 01 01 12 |
| 2BB0 | 02 01 3F 03 01 6C 04 01 99 00 01 12 02 50 49 42 |

The system can also easily be used as an interactive information center. A touch-tone keypad or telephone 16 is connected locally to line 46 and a list of questions with corresponding 3 digit message identifier is provided. In this way, rather than waiting in line to ask questions, a person simply consults the list of questions at the information center or even a remote station and depresses the 3 digit message identifier for the desired information.

By suitable programming the system can also be adapted for use as a telephone mailbox system which can take messages for several users and play them back automatically. In this system, each caller has the option of either recording or listening to selected messages by use of appropriate touch-tone codes. Each user is given a "mailbox" number corresponding to a specific position on the recording medium. When a caller wishes to record a message at that position, he keys in a "recording mailbox" number and records the message. When a caller keys in the "mailbox" number, the message or messages at that position will be replayed.

The information storage and retrieval system of this invention is therefore very versatile and a large number of applications are possible. If used as an information retrieval system, a large number of messages can be provided and the messages can be quickly and simply updated as necessary. Messages in different languages could be recorded.

It will be clear that modifications can be made to the disclosed embodiment without departing from the scope of the invention. The invention is therefore not limited to the disclosed embodiment but is defined by the appended claims.

What is claimed is:

1. An automatic user selected variable telephone message playback system, comprising:
   a recorder unit for recording information messages in a series of predetermined message areas on a recording medium each of said message areas being associated with a respective multiple digit message identifier corresponding to a particular series of telephone Touch-Tone signals, said recorder unit including drive means for driving said recording medium to the beginning of any one of said message areas and means for playing the information message in that message area;
   a telephone coupler unit including means for connection to a telephone line and means for detecting incoming calls by a user on said telephone line;
   an audio switching unit including means for selectively connecting said telephone line via said telephone coupler unit to said recorder unit in response to detection by said telephone coupler unit of a telephone call;
   said selectively connecting means of said audio switching unit comprising a multi-directional switch assembly means operated by said automatic controller, said assembly means having four inputs and three outputs, the controller including means for controlling which of the inputs is connected to which of the outputs;
   the four inputs comprising: a message recording line input; a data input connected from said automatic controller; a telephone line input connected from the telephone coupler unit; an input connected from an output of the recorder unit; and
   the three outputs comprising: an output connected to an input to the recorder unit; a data output connected to the input of the automatic controller; and an output connected to the telephone coupler unit;
   an automatic controller for controlling the operation of said units, said controller including:
   means for monitoring said telephone line of said connected telephone call to detect a series of Touch-Tone signals on said telephone line entered from a user-operated Touch-Tone telephone and representing a message selected by said user;
   means for associating said user-entered Touch-Tone signals with the corresponding message identifies;
   means for automatically operating said recorder unit drive means in response to said detected Touch-Tone signals to drive said recording medium to the beginning of the message area associated with said corresponding message identifier, and for operating said recorder unit to play the information message store in said message area over said telephone line via said switching unit and coupler unit;
   said controller selectably controlling said audio switching unit to connect said message recording line input through the output to the recording unit input in order to record a message on said recording medium;
   said controller selectably controlling said audio switching unit to connect said data input form the automatic controller through the output to the recording unit input in order to write a beginning of message marker and an end of message marker onto said recording medium;
   said controller selectably controlling said audio switching unit to connect said input from the recorder unit output through the output to the telephone coupler unit in order to enable a user to listen to a selected recorder message; and
   said controller selectably controlling said audio switching unit to connect said telephone line input from the telephone coupler unit through the output to the recorder unit input in order to enable a user to record a message onto said recording medium.

2. A system as claimed in claim 1, in which said switch assembly means comprises first switch means for providing an internal output from said four inputs, second switch means for providing an internal input to said three outputs, and an automatic gain control circuit connected between the internal output of said first switch means and the internal input of said second switch means whereby to produce a constant output signal to said second switch means for widely varying input signal strengths between said four inputs to said first switch means.

3. A system as claimed in claim 2, in which said first switch means comprises a set of four independently controllable switches connected in parallel from respective inputs and said second switch means comprises a set of three independently controllable switches connected in parallel to respective outputs.

4. A system as defining claim 1, further including a keyboard unit connected to said controller for permitting an operator to enter alternative message signals for identification as the message identifier whereby to provide an alternative to the user-entered Touch-Tone signals.

5. A system as claimed in claim 1, in which said controller includes means for collecting and storing system data including statistical data concerning access to said recording medium and whereby said system further includes data readout means connected to said controller for permitting an operator to readout said system data.

6. A system as claimed in claim 1, including counter means associated with said monitoring means of said controller for counting the number of times each one of a plurality of said message identifiers is entered by the user indicating the number of times each message is requested to be played back to the user, and means for storing an accumulated count after each message is played back and for permitting an operator to read out the accumulated counts on said readout means.

7. A system as claimed in claim 6, in which said readout means comprises a printer unit.

8. A system as claimed in claim 1, in which said recorder unit comprises a tape recorder for use with said recording medium, said recording medium comprising a cassette tape, said tape recorder having a reel counter means for indicating the relative position of the tape in said recorder, and said controller including means for monitoring said reel count means to monitor the position of the tape corresponding to said message area.

9. A system as claimed in claim 1, in which said controller includes means for delivering a beginning of message marker signal to said recorder and for actuating said recorder to record said beginning of message marker on said tape at the beginning of each of said message areas.

10. A system as claimed in claim 9, in which said controller includes means for actuating said recorder drive means to return said recording medium to a predetermined start position at the end of every telephone call.

11. A system as claimed in claim 8, in which said tape recorder has four record and four play heads for association with four tracks on said tape, and a multi-directional switch means for controlling which of said heads is operational at any time in response to operating commands from said controlling means, said switch means having four inputs, each of which is connected to a respective one of said heads, and two outputs, a recorder output line connected to the input of said audio switching unit, and a recorder input line connected to the output of said audio switching unit, the controlling means selectably controlling said multi-directional switch means whereby to selectively connect one of said four record heads or said four play heads, respectively, between said recorder input line or said recorder output line.

12. A system as claimed in claim 8, including means for slowing down the tape drive of the tape recorder to run at substantially less than normal speed, so as to increase the amount of information recorded on a given length of tape.

13. A system as claimed in claim 1, including an alarm associated with a timer means connected to said monitoring means, said timer means activating said alarm if no touch-tone signals are detected within a predetermined time after said telephone call is detected and said telephone line is connected to said recorder unit.

14. A system as claimed in claim 13, including further timer means activated by said alarm for disconnecting said telephone line from said telephone coupler unit and returning said recorder unit to a start position if an operator intervention signal is not detected by said monitoring means within a predetermined time after said alarm is actuated.

15. A system as claimed in claim 1, in which said automatic operating means of said controller is responsive to a first set of said detected touch-tone signals by said monitoring means whereby to drive said recorder unit to said message area associated with the entered touch-tone signals to play the information message in a message area corresponding to said first set, and is further responsive to a second set of detected touch-tone signals to record a user message in a message area corresponding to said second set.

16. A system as claimed in claim 1, in which said controller comprises an electronic control circuit.

17. A system as claimed in claim 1, in which said controller comprises data storage means for storing data and program instructions, and processing means for operating said system in response to said program instructions and in response to signals detected from said system, and said switching unit comprises a plurality of switch means for selectively connecting said recorder unit, said telephone coupler unit, and said monitoring means, said processing means controlling operation of each of said switch means on detection of signals from said system so as to connect the units of the system responsive to said signals, the operation of the system being such that said telephone coupler unit is initially connected to said processing means for detection of incoming telephone calls then operating said switching unit whereby said monitoring means can detect said series of touch-tone signals on said telephone lines then said switching unit being operated to connect said telephone line to said recorder unit for playing the information message in a home message area over said telephone line.

18. A system as claimed in claim 1, in which said automatic controller comprises a central processing unit associated with a memory in which program instructions and data are stored, and peripheral interface means for operatively connecting said processing unit to said recorder unit, said coupler unit and said switching unit, in response to program instructions stored in said memory and said means for associating said message identifier's with said user-entered touch-tone signals and a predetermined message areas on said recording medium according to data stored in said memory.

19. A system as claimed in claim 18, in which said central processing unit comprises a microprocessor.

20. The system as claimed in claim 4, wherein said controller further includes an end of message detection means and said controller is responsive to said end of message detection means during playing of a message to detect said end of message marker, and said operating means operates said recorder unit in response to detection of said end of message marker to drive said recording medium to a home position, and to disconnect said telephone coupler unit from said telephone line.

21. An automatic user selected variable telephone message record and playback system, comprising:
   means for recording and playing information messages, each message location being associated with a multiple digit message identifier corresponding to a particular series of telephone Touch-Tone signals;
   a telephone coupler unit including means for connection to a telephone line and means for detecting incoming calls by a user on said line;
   an audio switching unit including means for selectively connecting said telephone line via telephone coupler unit to said message recording and playing means on detection of a call by said coupler unit; and
   an automatic controller for controlling operation of said system, said controller being associated with said message storing means, coupler unit and switching unit, said controller including monitoring means for monitoring said connected calls to detect touchtone signals from said user, means for locating the message area associated with said touchtone signals with the corresponding message identifier, and further including operating means connected to said playing and recording means to play the particular information message at the message locator associated with said message identifier corresponding to said series of touchtone signals.

22. An automatic user-selected variable telephone message record and playback system, comprising:
   a recorder unit for recording and playback of informational audio messages stored in assigned message areas of a recording medium, said recorder unit having respective recording input line and playback output line;
   a telephone coupler unit for connecting to a telephone line and detection of an incoming telephone call, said telephone coupler unit having telephone coupler input line and telephone coupler output line;
   an audio switching unit for selecting connecting said recorder unit recording input line and playback output line to said telephone line via said telephone coupler unit input line and telephone coupler unit output line and, alternatively, to said telephone coupler unit input line to a peripheral interface means of an automatic controller;
   said automatic controller including a processor, memory, and said peripheral interface means for monitoring and controlling said telephone coupler unit; said recorder unit, and said audio switching unit;
   said controller being responsive to detection of said telephone call for operating said audio switching unit to connect said recorder unit playback output line to said telephone coupler unit output line and operating said recorder unit such that said recording medium is driven to a home message area and playing the home informational message over said playback output line then operating said audio switching unit to alternatively connect said telephone coupler unit input line to the peripheral interface means of the automatic controller whereby said automatic controller and monitors the incoming telephone line and then being responsive to a series of user generated touch-tone signals on said telephone line said Touch-Tone signals indicating the address of the assigned message areas, said controller operates said audio switching unto to alternatively connect said recorder unit playback output line to said telephone coupler unit output line then operating said recorder unit such that said recording medium is driven to the assigned message area associated with the series of touch-tone signals, and playing said information message at said assigned message area over said recorder unit output line to said telephone coupler unit output line to said user.

23. The system of claim 22, wherein said controller is further responsive to a different series of user generated touch-tone signals whereby to operate said audio switching unit to connect said recorder unit recording unit input line to said telephone coupler unit input line and operating said recorder unit to record a user message in a different message area which is associated with said different series of signals.

24. An automatic user-selected variable message record and playback system, comprising:
   an automatic controller having data storage means for storing data and program instructions, and processor means for controlling operation of said system;
   a telephone coupler unit having respective input and output lines for connection a telephone line to detect incoming calls from a user;
   a recorder unit, having respective input and output lines, for storing information messages in a series of predetermined addressed message areas on a recording medium;
   and an audio switching unit for selectively connecting said input and output lines of said telephone coupler unit to said input and output lines of said recorder unit;
   said automatic controller unit having a data input line connected to said audio switching unit for monitoring data on said telephone input line via said audio switching unit, and a processor output connected to said switching unit for transmitting data through said audio switching unit in response to said program instructions, and a control signal output for controlling the recorder unit and the switch configuration of said audio switching unit;
   said data storage means including a set of message identifiers each corresponding to one of said predetermined addressed message areas on said recording medium;
   said controller operating in response to said program instructions to perform the following sequence of operations:
      (a) monitoring a status signal from said telephone coupler unit for detecting of incoming telephone calls on said telephone line;
      (b) on detection of an incoming call, configuring said switching unit to connect said telephone line through said coupler unit output line and said switching unit to said recorder unit output line, and playing the information message at a preselected home message area over said recorder unit output line;

(c) configuring said switching unit to connect said telephone line through said telephone coupler unit input line and said switching unit to the data input of said controller for monitoring said connected telephone line to detect a series of touch-tone signals corresponding to a user-selected message identifier;

(d) associating said user-selected message identifier with a selected addressed message area on said recording medium in response to data stored in said storage means;

(e) configuring said switching unit to connect said telephone line through said telephone coupler unit output line and said switching unit to said recorder output line and operating said recorder unit to drive said recording medium to said user-selected addressed message area and to play back the information message stored in said user-selected addressed message area to said user over said recorder unit output line via said switching unit and coupler unit;

(f) disconnecting said telephone line at the end of a cell sequence operating said recorder unit to return said recording medium to said preselected home message area.

25. The system of claim 24, in which said data storage means includes a set of record message identifiers each corresponding to a set of predetermined record message areas on said recording medium for storing user generated audio information messages received over said telephone line, said recorder unit includes means for recording said user generated audio messages, said sequence of operations including the steps of:

configuring said switching unit to connect said telephone line through said telephone coupler unit input line and said switching unit to the data input of said controller for monitoring said connected telephone lines to detect a second series of touch-tone signals correspond to a recorded messsage identifier;

associating said record message identifiers with a selected record message area on said recording medium in response to data stored in said storage means;

configuring said switching unit to connect said telephone line through said coupler unit telephone coupler unit input line and said switching unit to said record input line of said recorder unit, and operating said recorder unit to drive said recording medium to the record message area corresponding to said record message identifier, and operating said recorder unit to record a user generated incoming message delivered over said telephone line.

26. The system of claim 24, wherein the sequence includes the further step of accepting a system operator generated message identifier from a keyboard unit connected to the controller via a controller keyboard input instead of the user-selected message identifier if no touch-tone signals are detected within a predetermined time after an incoming call is detected.

27. The system of claim 24, wherein the sequence includes the further step of configuring the audio switching unit to connect the telephone line through the telephone coupler unit input line and audio switching unit to the controller data input to monitor said telephone line for a further series of touch-tone signals corresponding to a second user-selected message identifier after the information message associated with the first user-selected message identifier has been played, and disconnecting said telephone line if an additional series of touch-tone signals is not detected within a predetermined disconnect time.

28. The system of claim 24, further including a manually operated keyboard unit and a data readout unit for operation by a system operator, said controller having connection means to said keyboard unit and data readout unit, such that said operator can, pursuant to programmed instructions of said processor means, input data and commands from said keyboard unit whereby to cause the controller to configure said switching unit to connect an audio microphone input through said switching unit to said recorder input line and operate said recorder unit to record said informational message from said system operator in predetermined message areas on said recording medium, and, additionally, to readout data stored in said storage means over said readout unit as generated by said automatic controller in response to program instructions such as, for example, the accumulated number of times a specific message identifier has been selected.

29. An automatic user selected variable telephone message playback system, comprising:

a recorder unit for recording information messages in a series of predetermined message areas on a recording medium each of said message areas being associated with a respective multiple digit message identifier corresponding to a particular series of telephone touch-tone signals, said recorder unit including drive means for driving said recording medium to the beginning of any one of said message areas and means for playing the information message in that message area;

a telephone coupler unit including means for connection to a telephone line and means for detecting incoming calls by a user on said telephone line;

an audio switching unit including means for selectively connecting said telephone line via said telephone coupler unit to said recorder unit in response to detection by said telephone coupler unit of a telephone call;

an automatic controller of controlling the operation of said units, said controller including:

means for monitoring said telephone line of said connected telephone call to detect a series of Touch-Tone signals on said telephone line entered from a user-operated touch-tone telephone and representing a message selected by said user entered Touch-Tone signals said series of Touch-Tone signals corresponding to the actual physical location of the message area on the recording medium;

means for automatically operating said recorder unit drive means in response to said detected Touch-Tone signals to drive said recording medium to the beginning of the message area indicated by said series of Touch-Tone signals and for operating said recorder unit to play the information message stored in said message area over said telephone line via said switching unit and coupler unit.

30. The system as claimed in claim 4 whereby said keyboard unit permits the operator to sequentially enter control signals and beginning and end of message marker signals to said automatic controller whereby said operating means is responsive to said control signals for formatting said recording medium by advancing said recording medium and recording a beginning of message marker and an end of message marker in response to said sequentially enter control signals and beginning and end of message marker signals.

* * * * *